United States Patent Office 2,889,313
Patented June 2, 1959

2,889,313

COMPOSITION COMPRISING SYNTHETIC DIENE RUBBER AND A POLYHALOGENATED POLYCARBOXYLATE CROSS-LINKING AGENT

Tracy M. Patrick, Jr., Kirkwood, Mo., assignor to Monsanto Chemical Company, St. Louis, Mo., a corporation of Delaware No Drawing. Original application January 13, 1954, Serial No. 403,905, now Patent No. 2,775,615, dated December 25, 1956. Divided and this application October 5, 1956, Serial No. 614,063

2 Claims. (Cl. 260—83.3)

The present invention provides new and valuable polyhalogenated polycarboxylates, methods of producing the same, and improved rubbers comprising the new polycarboxylates.

According to the invention there are provided new and highly valuable halogen-containing esters by the free-radical-catalyzed addition of certain polyhalomethanes and certain allyl esters. The reaction is one of simple addition in which one mole of the halomethane compound adds to from 2 to 7 moles of the allyl ester. It appears to be general for allyl esters of oxygen-containing acids, the halomethane adding to the allyl portion of the ester substantially according to the scheme:

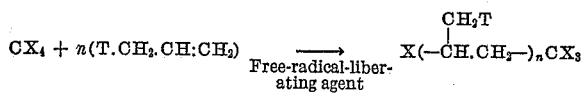

in which X is selected from the class consisting of hydrogen, chlorine and bromine and in which only one X is hydrogen in a single compound, $n$ is an integer of from 2 to 7 and T is the acid portion of an oxygen-containing ester of allyl alcohol.

Polyhalomethanes suitable for the present purpose are, e.g., tetrachloromethane, tetrabromomethane, bromotrichloromethane, chlorotribromomethane, chloroform, bromoform, etc. Allyl esters which may be employed include allyl esters of monocarboxylic acids, for example, allyl formate, allyl acetate, allyl propionate, allyl butyrate, allyl caproate, allyl laurate, allyl myristate, allyl stearate, allyl benzoate, allyl 4-toluate, allyl cyclohexanoate, allyl abietate, allyl dehydroabietate and allyl furoate; allyl esters of di- and polycarboxylic acids, for example, diallyl fumarate, diallyl phthalate, diallyl terephthalate, diallyl oxalate, diallyl suberate and triallyl aconitate, allyl esters of oxygen-containing inorganic acids, for example, allyl phosphate, allyl nitrate, allyl sulfate; and allyl esters of organic non-carboxylic, oxygen-containing acids such as allyl 4-toluenesulfonate, allyl benzenephosphonate, etc.

As indicated above, my new halogen compounds are low-molecular weight addition products of the polyhalomethane with from 2 to 7 moles of the allyl ester. Depending upon the number of moles of the ester which had entered into the reaction, as well as upon the nature of the individual reactants, the new addition products vary from mobile to viscous liquids. They are advantageously employed for a wide variety of industrial purposes, for example, as plasticizers for synthetic resins and plastics, as fire-proofing agents for cellulosic and other textile materials, as lubricant adjuvants, etc.

Particularly valuable as cross-linking agents in the vulcanizing of natural rubber or synthetic rubbers such as the polymers and copolymers of 1,3-butadiene compounds are addition products of the polyhalomethanes with from 2 to 7 moles of an allyl ester of a fatty acid of from 1 to 21 carbon atoms. When the allyl ester is that of a fatty acid, the 1:2 halomethane-allyl ester adducts have the formula:

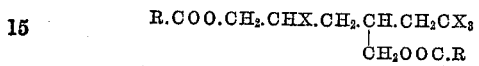

in which R is hydrogen or an alkyl radical of from 1 to 20 carbon atoms. Thus such 1:2 adducts are the 4-acyloxymethyl-2,6,6,6-tetrachlorohexyl esters of the fatty acids.

Allyl esters of dicarboxylic acids or of tricarboxylic acids may be similarly converted to polyhalogenated hexyl esters. Thus the free-radical-catalyzed addition of carbon tetrachloride and diallyl phthalate or diallyl maleate may be effected to give bis(4-acyloxymethyl-2,6,6,6-tetrachlorohexyl)phthalate or maleate.

Formation of the present adducts probably proceeds through a chain mechanism, with termination of the chain at an early state, i.e., at a point at which probably up to 7 moles of the ester have added to one mole of the halomethane. Depending upon the nature and the quantity of the reactants and of free-radical-liberating agent, as well as upon the reaction conditions, chain propagation may be terminated at various stages to yield products in which from 2 to 7 moles of the ester have combined with one mole of the halomethane.

Free-radical-liberating agents which may be employed in promoting addition of the present allyl esters to the polyhalomethane are compounds which will decompose to give free radicals. Such compounds include peroxygen-type catalysts, for example acyl peroxides such as acetyl, benzoyl, lauroyl or stearoyl peroxides; hydrocarbon peroxides or hydroperoxides such as di-tert-butyl peroxide, di-tert-amyl peroxide, tert-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetraethyl lead, etc. For convenience, the peroxygen type catalysts will be hereinafter referred to as peroxidic compounds. Only catalytic quantities of a free-radical-liberating agent need be employed in promoting the addition reaction. Quantities of as little as 0.001 percent to 1.0 percent, based on the weight of the allyl ester, are generally sufficient to give optimum yields of the polyhalo esters. In order to avoid detrimental side reactions, quantities of more than 5 percent of the catalyst, based on the weight of the ester component should not be employed. Ultra-violet light may be employed with the catalyst or as the sole catalytic agent.

The present polycarboxylates are readily obtainable by contacting the allyl ester with the polyhalomethane at ordinary or increased temperatures in the presence of a free-radical-liberating agent as catalyst until formation of addition products having the desired viscosity characteristics has taken place. The reaction may be effected by mixing together the ester, halomethane and catalyst, and maintaining the resulting mixture, advantageously with agitation, at a temperature which permits steady decomposition of the catalyst and consequent steady liberation of free-radicals. Or, if desired, the halomethane may be added gradually, e.g., dropwise, to the ester while constantly maintaining an optimum quantity of active catalyst in the reaction zone, which zone is preferably kept at a temperature conducive to the formation of free-radicals. Depending upon the nature of the individual reactants and catalyst and the properties desired in the final product, increased temperatures, e.g., temperatures of from above room temperature to about 125° C. may be generally employed. The reaction time may vary from, say, several hours to several days.

Adducts having from 2 to 7 moles of the allyl ester combined with one mole of the polyhalomethane are formed irrespective of the reactant proportions. Generally the reaction mixture comprises a mixture of adducts having varying proportions (from 2 to 7 moles) of the allyl ester combined with one mole of the polyhalomethane. While such adducts may be separated from each other, e.g., by fractional distillation, for many purposes, isolation of the adducts is unnecessary, mixtures of the polycarboxylates being useful as plasticizers for synthetic resins, as vulcanizing agents for rubbers, as lubricant additives, etc.

Inasmuch as addition products of one mole of the polyhalomethane with from 2 to 7 moles of the allyl ester are generally valuable as cross-linking agents for natural rubber or synthetic rubbers such as the polymers and copolymers of 1,3-butadiene compounds, reaction products resulting from the free-radical-catalyzed addition reaction of a polyhalomethane and the allyl esters generally may be added directly to the rubber stock. The use of the crude reaction product, without the necessity of tedious isolating steps which are often involved in the preparation of the individual adducts, provides a highly economic means of improving the vulcanizing properties of rubber. Of special importance as cross-linking agents for synthetic rubbers obtained by polymerizing a 1,3-butadiene compound either alone or in admixture with other polymerizable compounds which are capable of copolymerizing with the 1,3-butadiene compounds, are addition products having the general formula:

$$CH_2 \cdot O_2CR$$
$$X(-CH \cdot CH_2-)_n CX_3$$

in which R is an alkyl radical of from 1 to 20 carbon atoms, n is a number of from 2 to 7, and X is selected from the class consisting of hydrogen, chlorine and bromine and in which only one X is hydrogen in a single compound. Adducts having this formula are easily prepared in good yields from readily available allyl esters and the polyhalomethanes, and either mixtures of the adducts in which there are present from 2 to 7 moles of the allyl ester or the isolated adducts confer valuable vulcanizing properties to the 1,3-butadiene rubbers.

As examples of 1,3-butadiene compounds which yield synthetic rubbers by polymerization or copolymerization are 1,3-butadiene, chloroprene, piperylene, 2-3-dimethyl-1,3-butadiene, etc. As illustrative of compounds which copolymerize with the 1,3-butadiene compounds to yield rubbers whose vulcanizing properties are improved by the carbon tetrachloride-allyl ester adducts may be mentioned compounds containing a vinyl ($CH_2=CH-$) group, for example, aryl olefins such as styrene, vinylbiphenyl and vinylnaphthalene, acrylic or methacrylic acids and their derivatives such as acrylonitrile, methyl methacrylate and methacrylamide; alkyl vinyl esters such as methyl vinyl ether; alkyl vinyl ketones such as isopropenyl methyl ketone, aliphatic olefins such as isobutylene etc.

The invention is further illustrated, but not limited by the following examples:

*Example 1*

A mixture consisting of 100 g. (1.0 mole) of allyl acetate, 308 g. (2.0 moles) of carbon tetrachloride and 3.0 g. of benzoyl peroxide was refluxed for 19 hours (temperature of from 81° C. to 84° C.). Fractionation of the resulting reaction product gave a fraction, B.P. 135° C./2 mm. to 205° C./3 mm. (mostly at 170° C.–180° C./2 mm.), $n_D^{25}$ 1.4831. 93.6 g. (53% theoretical yield).

Redistillation of this fraction gave the substantially pure 1:2 carbon tetrachloride-allyl acetate addition product, 4-acetoxymethyl-2,6,6,6-tetrachlorohexyl acetate, B.P. 147° C.–150° C./1 mm., $n_D^{25}$ 1.4824

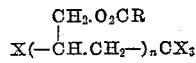

analyzing 39.26% chlorine (calcd. for $C_{11}H_{16}O_4Cl_4$ 40.04% Cl).

*Example 2*

A mixture consisting of 50 g. (0.5 mole) of allyl acetate and 179.2 g. (1.5 moles) of chloroform was refluxed for 10 minutes and 2.0 g. of benzoyl peroxide was then added. Refluxing was then continued for another 16.5 hours and an additional 1.0 gram of benzoyl peroxide added. When refluxing had been allowed to continue for a total of 88 hours, the product was distilled to give (I) A fraction, B.P. 143° C.–190° C./1.0 mm., $n_D^{25}$ 1.4720.

(II) As residue, material B.P. above 190° C./1.0 mm., analyzing 15.31% Cl (corresponding to an average molecular weight of 695 and thus to an adduct in which an average of 5.75 moles of the ester have added to one mole of chloroform).

(I) was redistilled to yield:

A. B.P. 140° C.–150° C./1.0 mm., $n_D^{25}$ 1.4711

$$d_{25}^{25}\ 1.2453$$

substantially pure 4-acetoxymethyl-6,6,6-trichlorohexyl acetate, analyzing 32.76% chlorine (calcd. for $C_{11}H_{17}O_4Cl_3$, 33.30% Cl).

B. Residue analyzing 28.42% chlorine (corresponding to an average molecular weight of 375, and thus to an adduct in which an average of 2.5 moles of the ester have added to one mole of the chloroform).

*Example 3*

This example shows the preparation of 4-acetoxymethyl-2,6,6,6-tetrachlorohexyl acetate and its evaluation as a cross-linking agent in the synthetic rubber Hycar OR-15 (a butadiene-acrylonitrile copolymer).

Refluxing for 41 hours of a mixture consisting of 100 g. (1.0 mole) of allyl acetate, 308 g. (2.0 moles) of carbon tetrachloride and 4.0 g. of benzoyl peroxide and fractionation of the resulting reaction mixture gave 69.4 g. of the crude 2:1 allyl acetate-carbon tetrachloride adduct, B.P. 165° C.–183° C./2 mm., which upon redistillation gave 51.8 g. of the substantially pure 4-acetoxymethyl-2,6,6,6-tetrachlorohexyl acetate, B.P. 163° C.–166° C./1.5 mm., $n_D^{25}$ 1.4819.

Comparative tests on the vulcanizing efficiency of the above 4-acetoxymethyl-2,6,6,6-tetrachlorohexyl acetate gave the results shown in the following table, this compound being designated as N-4442:

Base formula:
Hycar OR-15_____100.0
Pelletex [1]_____50.0
Stearic acid_____1.0

| Expt. No. | Additive | Amount | Stress-Strain Data | | | | | | |
|---|---|---|---|---|---|---|---|---|---|
| | | | Min. cure at 150° C. | Shore "A" hardness | 300% modulus, p.s.i. | 700% modulus, p.s.i. | Ultimate tensile strength, p.s.i. | Ultimate Elong., percent | Compression set ASTM "B" |
| 1 | None | | | 90 | 65 | 660 | 970 | 1,025 | 670 | 28.4 |
| 2 | Zinc oxide | 5.0 | | 90 | 70 | 600 | 875 | 970 | 700 | 28.2 |
| 3 | {Zinc oxide / Thiofide [2]} | 5.0 / 1.5 | | 90 | 70 | 795 | 1,570 | 2,145 | 770 | 22.4 |
| 4 | N-4442 | 2.0 | | 90 | 70 | 1,355 | 2,505 | 2,615 | 555 | 17.4 |
| 5 | {Zinc oxide / N-4442} | 5.0 / 2.0 | | 90 | 70 | 840 | 1,390 | 1,515 | 610 | 23.6 |
| 6 | {Zinc oxide / Thiofide / N-4442} | 5.0 / 1.5 / 2.0 | | 90 | 70 | 1,085 | 2,100 | 2,585 | 700 | 24.1 |
| 7 | N-4442 | 5.0 | | 90 | 70 | 705 | 1,260 | 1,345 | 615 | 20.1 |
| 8 | {Zinc oxide / N-4442} | 5.0 / 5.0 | | 90 | 70 | 970 | 1,720 | 1,910 | 615 | 22.0 |
| 9 | {Zinc oxide / Thiofide / N-4442} | 5.0 / 1.5 / 5.0 | | 90 | 70 | 1,205 | 2,320 | 2,630 | 675 | 24.6 |

[1] A carbon black supplied by General Atlas Carbon Co., Boston, Massachusetts.
[2] A rubber accelerator supplied by Monsanto Chemical Co., St. Louis, Missouri.

The above data shows that 4-acetoxymethyl-2,6,6,6,-tetrachlorohexyl acetate has excellent cross-linking characteristics for Hycar OR-15. In general best results are obtained when only carbon black and stearic acid are used with the chloro compounds.

*Example 4*

A mixture consisting of 300 g. (3.0 moles) of allyl acetate and 1540 g. (10.0 moles) of carbon tetrachloride was brought to refluxing temperature (80.5° C.), 3.0 g. of benzoyl peroxide was then added, and the whole was refluxed for 16.5 hours. An additional 2.0 g. of benzoyl peroxide was then added and refluxing was continued for 7.5 hours, at the end of which time another 2.0 g. of benzoyl peroxide was added. Subsequent refluxing to give a total refluxing time of 44 hours gave a clear, yellow reaction mixture. This was cooled and extracted three times with sodium bicarbonate solution and then twice with water. After drying over sodium sulfate and filtering, unreacted carbon tetrachloride was removed by distilling through a 2' Vigreux column. The yellow, cloudy residue was then transferred to a 10" Vigreux column, and distillation was continued to remove any material B.P. below 100° C./0.8 mm. There was thus obtained as residue 385.8 g. of the viscous adduct, $n_D^{25}$ 1.4838, analyzing 36.7% chlorine. This residue, corresponding to an adduct in which 2.3 moles of the ester have added to one mole of carbon tetrachloride, was found to confer very good vulcanizing properties to 1,3-butadiene elastomers.

Polybromomethanes or polyhalomethanes containing both bromine and chlorine may be used instead of carbon tetrachloride or chloroform, choice of the halomethane depending upon the contemplated application of the addition product. For most uses, i.e., for use as rubber cross-linking agents, lubricant additives, synthetic resin plasticizers, etc., the polychloromethane addition compounds are preferred both from the standpoint of economy and desirable physical characteristics. Use of the readily available allyl esters of hydrocarbon monocarboxylic acids, e.g., allyl acetate, allyl propionate, allyl 2-ethyl hexoate, allyl laurate, allyl oleate and allyl benzoate is generally more commercially feasible, these esters having an economic advantage in that from them there are produced at low cost and in good yields polyhalogenated polycarboxylates of significant value to the plastics, synthetic rubber and chemical industries.

This application is a division of my application Serial No. 403,905, filed January 13, 1954.

What I claim is:

1. A composition of matter comprising a copolymer of 1,3-butadiene and acrylonitrile and as a cross-linking agent a 4-acyloxymethyl-2,6,6,6-tetrachlorohexyl fatty acid ester of the formula

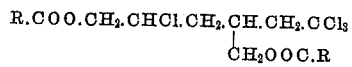

in which R is selected from the class consisting of hydrogen and alkyl radicals of from 1 to 20 carbon atoms.

2. A composition of matter comprising a copolymer of 1,3-butadiene and acrylonitrile and 4-acetoxymethyl-2,6,6,6-tetrachlorohexyl acetate, as a cross-linking agent therefor.

References Cited in the file of this patent

UNITED STATES PATENTS

| | | |
|---|---|---|
| 2,385,290 | Lichty | Sept. 18, 1945 |
| 2,468,208 | Kharasch | Apr. 26, 1949 |
| 2,775,615 | Patrick | Dec. 25, 1956 |